United States Patent
Luh

(12) 
(10) Patent No.: US 6,406,392 B1
(45) Date of Patent: Jun. 18, 2002

(54) TRANSMISSION ASSEMBLY

(75) Inventor: T. Y. Luh, Taichung Hsien (TW)

(73) Assignee: Jenn Jianq Co., Ltd., Taichung Hsien (TW)

( * ) Notice: Subject to any disclaimer, the term of this patent is extended or adjusted under 35 U.S.C. 154(b) by 29 days.

(21) Appl. No.: 09/650,209

(22) Filed: Aug. 29, 2000

(51) Int. Cl.⁷ .............................. F16H 7/14; F16H 7/12
(52) U.S. Cl. ...................... 474/117; 474/133; 474/135
(58) Field of Search ................................ 474/117, 133, 474/124, 116, 115, 135, 123, 136–138

(56) References Cited

U.S. PATENT DOCUMENTS

| | | | |
|---|---|---|---|
| 741,042 A | * 10/1903 | Kailor et al. | 474/133 |
| 1,520,949 A | * 12/1924 | Hemleb | 474/133 X |
| 1,982,299 A | * 11/1934 | Hapgood | 474/135 |
| 3,251,235 A | * 5/1966 | Cederberg et al. | 474/123 |
| 4,312,267 A | * 1/1982 | Shenberger | 474/118 X |
| 5,569,106 A | * 10/1996 | Splittstoesser et al. | 474/125 |

FOREIGN PATENT DOCUMENTS

| | | | |
|---|---|---|---|
| JP | 81921 | * | 3/1994 |
| JP | 249307 | * | 9/1994 |

* cited by examiner

Primary Examiner—David A. Bucci
Assistant Examiner—Marcus Charles
(74) Attorney, Agent, or Firm—Alan Kamrath; Rider, Bennett, Egan & Arundel, LLP

(57) ABSTRACT

A transmission assembly has a frame having a through hole, a transmission gear, a driven gear, and a transmission chain surrounding the transmission gear and the driven gear. A torsion spring has a first end and a second end. A swing arm has a round hole, a circular hole, and a through aperture. A shaft rod is inserted in the round hole of the swing arm. The shaft rod passes through the torsion spring and the through hole of the frame. An idle wheel engages with the transmission chain. A bearing is adjacent to the idle wheel. The pivot rod is inserted in the circular hole of the swing arm. The pivot rod passes through the ring and the idle wheel. The first end of the torsion spring is inserted in the through aperture of the swing arm. The second end of the torsion spring is hooked on the frame.

1 Claim, 3 Drawing Sheets

TRANSMISSION ASSEMBLY

BACKGROUND OF THE INVENTION

The present invention relates to a transmission assembly. More particularly, the present invention relates to a transmission assembly of a vehicle.

A conventional transmission system of a vehicle has a pressing plate to press a transmission chain. After a long period of usage, the pressing plate will not work very well so that the transmission chain will be damaged.

SUMMARY OF THE INVENTION

An object of the present invention is to provide a transmission assembly which has an idle wheel to adjust a tightening degree of a transmission chain.

Accordingly, a transmission assembly comprises a frame, a transmission gear disposed on the frame, a driven gear disposed on the frame, and a transmission chain surrounding the transmission gear and the driven gear. The frame has a through hole. A torsion spring has a first end and a second end. A shaft rod has an annular recess. A swing arm has a round hole, a circular hole, and a through aperture. A pivot rod has an annular groove. The shaft rod is inserted in the round hole of the swing arm. The shaft rod passes through the torsion spring and the through hole of the frame. A first C-shaped retainer encloses the annular recess of the shaft rod. An idle wheel engages with the transmission chain. A Bearing is adjacent to the idle wheel. The pivot rod is inserted in the circular hole of the swing arm. The pivot rod passes through the Bearing and the idle wheel. A second C-shaped retainer encloses the annular groove of the pivot rod. The first end of the torsion spring is inserted in the through aperture of the swing arm. The second end of the torsion spring is hooked on the frame. The torsion spring forces the swing arm and the idle wheel to move and vibrate upward. When the transmission chain is tight, the degree of vibration of the swing arm is small and the degree of vibration of the idle wheel is small also. When the transmission chain is loosened, the degree of vibration of the swing arm is large and the degree of vibration of the idle wheel is large also. Therefore, the idle wheel will adjust a tightening degree of the transmission chain.

DETAILED DESCRIPTION OF THE INVENTION

Figure 1:
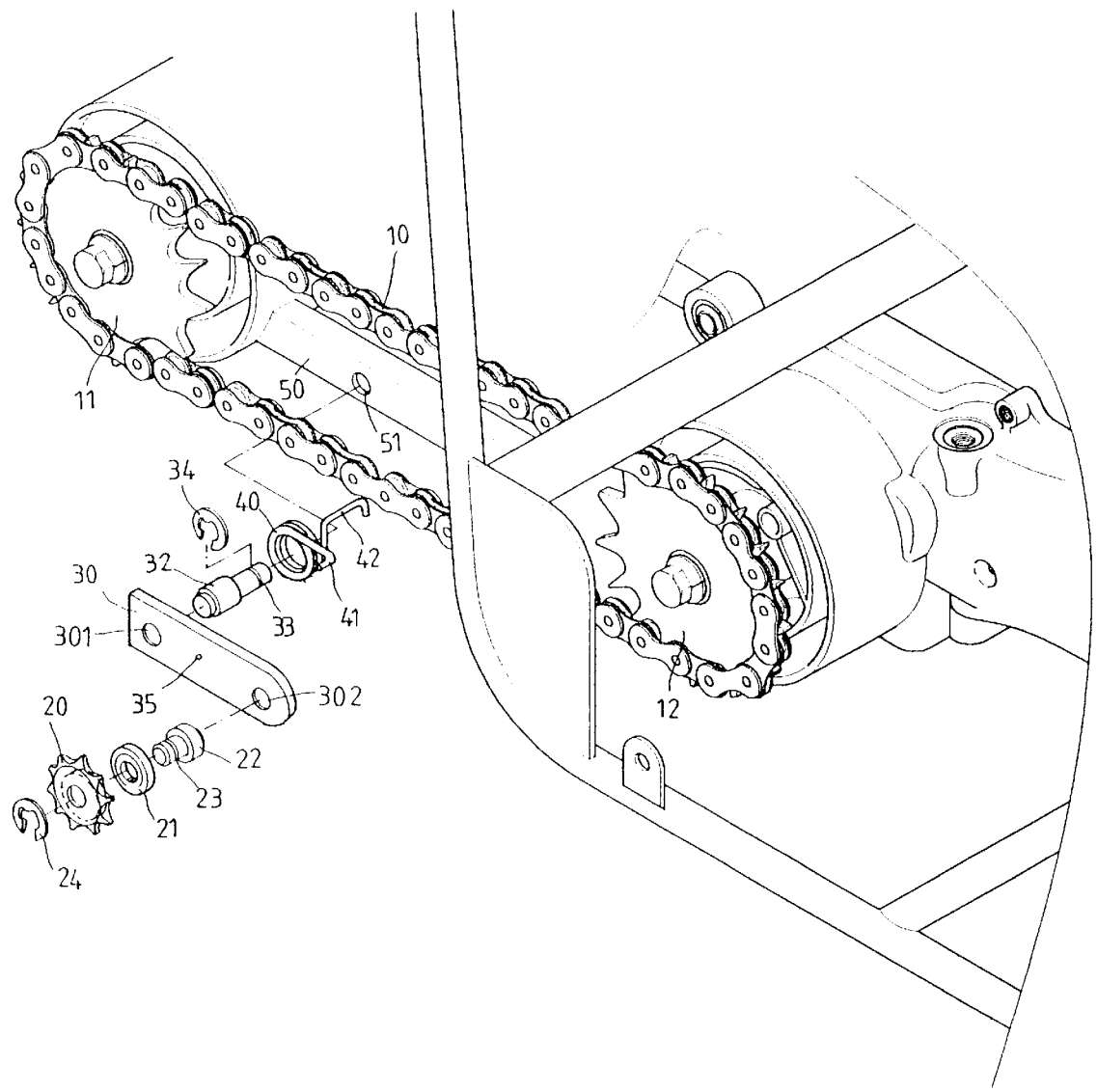
FIG. 1 is a perspective exploded view of a transmission assembly of a preferred embodiment in accordance with the present invention.
Figure 2:
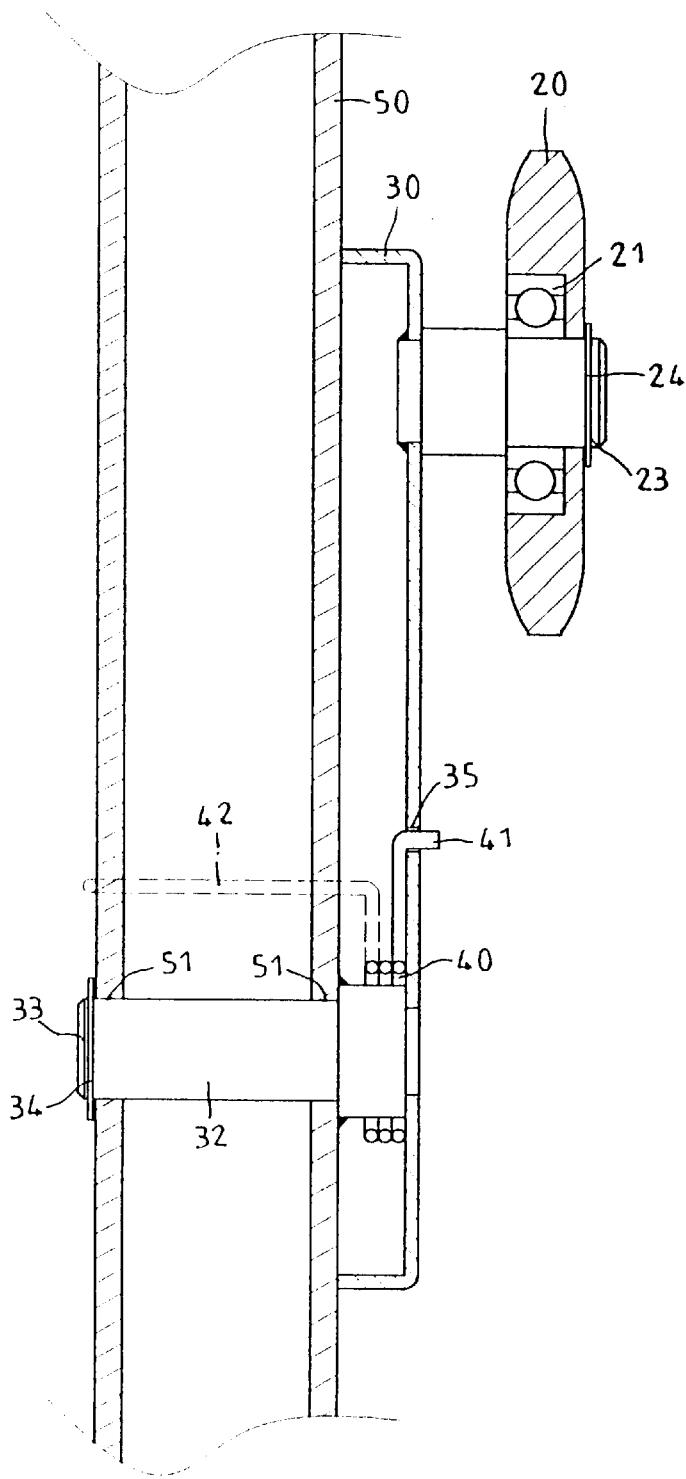
FIG. 2 is a sectional assembly view of a transmission assembly of a preferred embodiment in accordance with the present invention.
Figure 3:
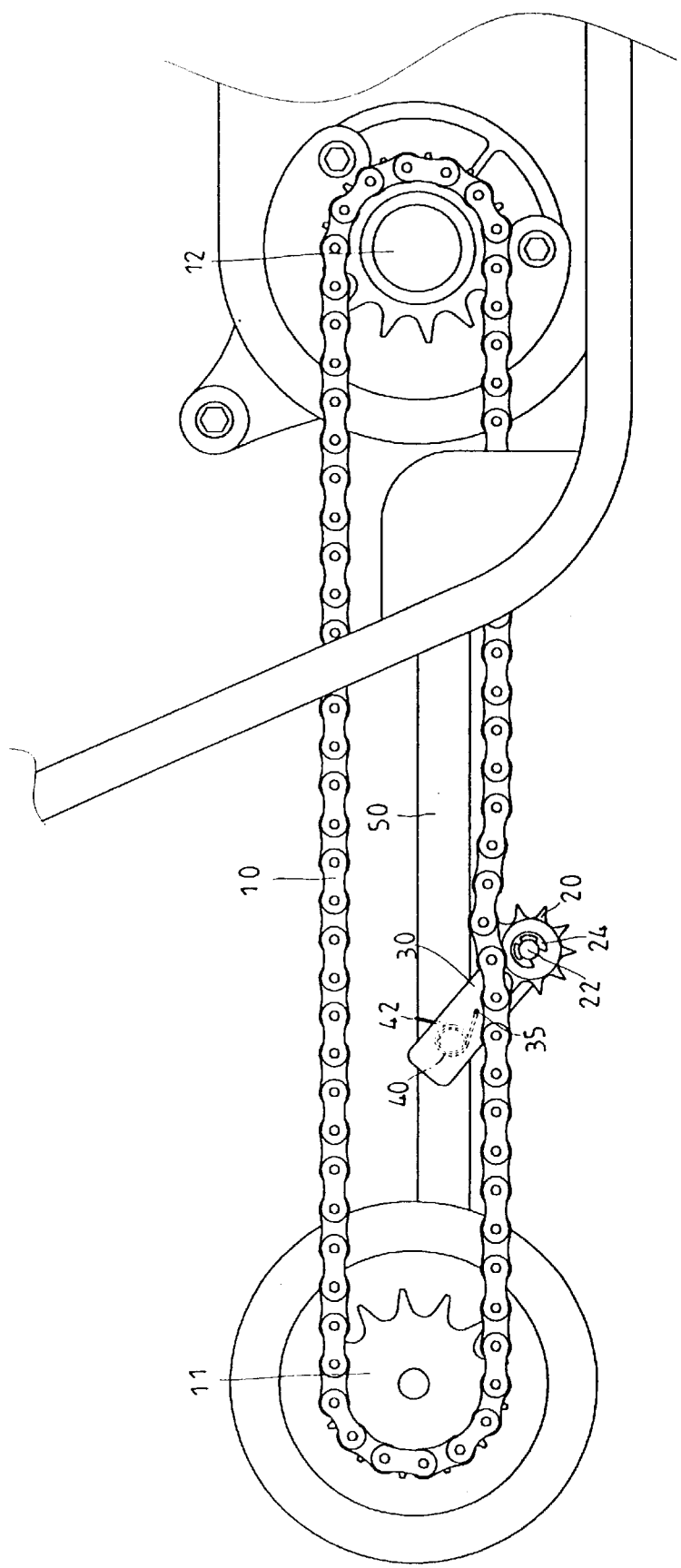
FIG. 3 is a schematic view illustrating an operation of an idle wheel of a transmission assembly of a preferred embodiment in accordance with the present invention.

Referring to FIGS. 1 to 3, a transmission assembly comprises a frame 50, a transmission gear 11 disposed on the frame 50, a driven gear 12 disposed on the frame 50, and a transmission chain 10 surrounding the transmission gear 11 and the driven gear 12.

The frame 50 has a through hole 51.

A torsion spring 40 has a first end 41 and a second end 42.

A shaft rod 32 has an annular recess 33.

A swing arm 30 has a round hole 301, a circular hole 302, and a through aperture 35.

A pivot rod 22 has an annular groove 23.

The shaft rod 32 is inserted in the round hole 301 of the swing arm 30. The shaft rod 32 passes through the torsion spring 40 and the through hole 51 of the frame 50.

A first C-shaped retainer 34 encloses the annular recess 33 of the shaft rod 32.

An idle wheel 20 engages with the transmission chain 10.

A Bearing 21 is adjacent to the idle wheel 20.

The pivot rod 22 is inserted in the circular hole 302 of the swing arm 30. The pivot rod 22 passes through the Bearing 21 and the idle wheel 20.

A second C-shaped retainer 34 encloses the annular groove 23 of the pivot rod 22.

The first end 41 of the torsion spring 40 is inserted in the through aperture 35 of the swing arm 30.

The second end 42 of the torsion spring 40 is hooked on the frame 50.

Referring to FIGS. 2 and 3 again, the torsion spring 40 forces the swing arm 30 and the idle wheel 20 to move and vibrate upward.

When the transmission chain 10 is tight, the degree of vibration of the swing arm 30 is small and the degree of vibration of the idle wheel 20 is small also.

When the transmission chain 10 is loosened, the degree of vibration of the swing arm 30 is large and the degree of vibration of the idle wheel 20 is large also.

Therefore, the idle wheel 20 will adjust a tightening degree of the transmission chain 10.

The invention is not limited to the above embodiment but various modification thereof may be made. Further, various changes in form and detail may be made without departing from the scope of the invention.

I claim:

1. A transmission assembly comprises
   a frame having a through hole,
   a transmission gear disposed on the frame,
   a driven gear disposed on the frame,
   a transmission chain surrounding the transmission gear and the driven gear,
   a torsion spring having a first end and a second end,
   a shaft rod having an annular recess,
   a swing arm having a round hole, a circular hole, and a through aperture,
   a pivot rod having an annular groove,
   the shaft rod inserted in the round hole of the swing arm,
   the shaft rod passing through the torsion spring and the through hole of the frame,
   a first C-shaped retainer enclosing the annular recess of the shaft rod,
   an idle wheel engaging with the transmission chain,
   a bearing adjacent to the idle wheel,
   the pivot rod inserted in the circular hole of the swing arm,
   the pivot rod passing through the ring and the idle wheel,
   a second C-shaped retainer enclosing the annular groove of the pivot rod,
   the first end of the torsion spring inserted in the through aperture of the swing arm,
   the second end of the torsion spring hooked on the frame, and
   wherein the torsion spring forces the swing arm and the idle wheel to move and vibrate upward.

* * * * *